Sept. 9, 1958  H. P. BISHOP  2,851,286
INLET VALVE ASSEMBLY FOR CENTRAL VACUUM SYSTEMS
Filed Dec. 17, 1956  4 Sheets-Sheet 1
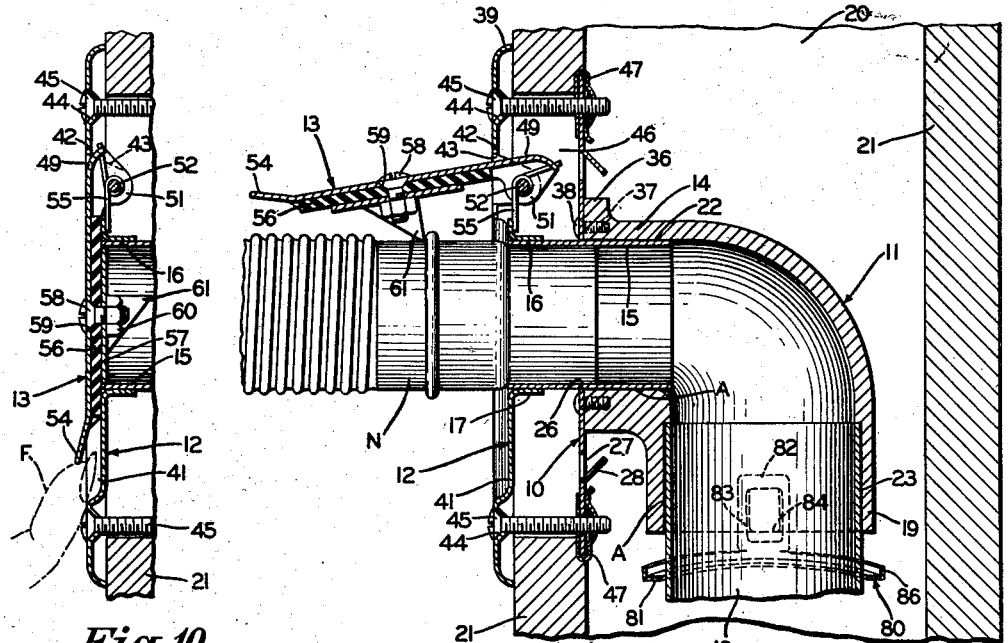
Fig.10
Fig.1
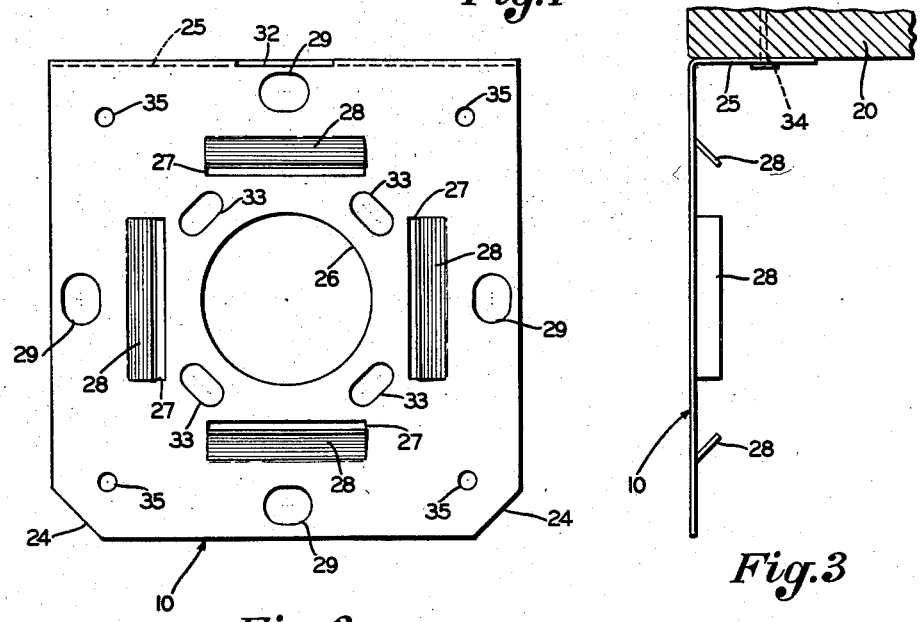
Fig.2
Fig.3
INVENTOR.
Harold P. Bishop
BY
Frease & Bishop
ATTORNEYS Sept. 9, 1958 H. P. BISHOP 2,851,286
INLET VALVE ASSEMBLY FOR CENTRAL VACUUM SYSTEMS
Filed Dec. 17, 1956 4 Sheets-Sheet 2

INVENTOR.
Harold P. Bishop
BY
Frease & Bishop
ATTORNEYS

Sept. 9, 1958     H. P. BISHOP     2,851,286
INLET VALVE ASSEMBLY FOR CENTRAL VACUUM SYSTEMS
Filed Dec. 17, 1956     4 Sheets-Sheet 3

INVENTOR.
Harold P. Bishop
BY
Frease & Bishop
ATTORNEYS

Sept. 9, 1958 H. P. BISHOP 2,851,286
INLET VALVE ASSEMBLY FOR CENTRAL VACUUM SYSTEMS
Filed Dec. 17, 1956 4 Sheets-Sheet 4

INVENTOR.
Harold P. Bishop
BY
Frease & Bishop
ATTORNEYS

United States Patent Office 2,851,286
Patented Sept. 9, 1958

2,851,286

INLET VALVE ASSEMBLY FOR CENTRAL VACUUM SYSTEMS

Harold P. Bishop, Louisville, Ohio, assignor to H-P Products, Inc., Louisville, Ohio, a corporation of Ohio Application December 17, 1956, Serial No. 628,878

8 Claims. (Cl. 284—18)

The invention relates to central vacuum systems for use in residential, commercial, industrial, educational, institutional and other buildings, and more particularly to the construction of an inlet valve assembly for such a system.

Such central vacuum systems comprise generally a vacuum apparatus including suction fan and dust collector means, located in the basement or utility room, the inlet side of such vacuum apparatus being connected to a system of tubing located mainly within the walls of the building and terminating in inlet valves located through the walls of the several rooms, halls or corridors, for selective insertion of a flexible hose with nozzle or other suitable cleaning attachment.

These inlet valves, to which the invention pertains, each comprises a wall plate with inlet opening, an elbow connected to the inlet opening and to the corresponding tube within the wall, a mounting plate located within the wall (except for some floor installations), and a normally closed, hinged cover upon the wall plate.

It is therefore a primary object of the invention to provide an inlet valve assembly including a wall plate with hinged cover, an elbow and a mounting plate.

Another object is to provide such an assembly having adjustable means for mounting the same in walls of various thicknesses.

A further object is to provide a novel form of mounting plate with means for universally mounting the same either vertically or horizontally upon either vertical or horizontal studding.

A still further object is to provide such a mounting plate having means for adjusting the position of the elbow relative thereto.

It is also an object to provide the mounting plate with adjustably mounted Tinnerman-type nuts and bolts for attaching the mounting plate within the wall, in either vertical or horizontal position.

Still another object is to provide access openings adjacent to each edge of the mounting plate for selective insertion of the Tinnerman-type nuts.

Another object of the invention is to provide elongated openings in the mounting plate for adjustment of the Tinnerman-type nuts so as to permit proper adjustment of the wall plate to vertical position with the mounting plate located in either vertical or horizontal position.

It is another object of the invention to provide an assembly of this type in which the free end of the hinged cover is out-turned, whereby the cover may be raised to open position by insertion of the hose adaptor beneath said out-turned end, so that the hose adaptor may be inserted in the inlet opening in a single movement.

A further object is to provide such an assembly including a finger opening on the hinged cover of the wall plate with a fingernail clearance between the same and the rubber sealing gasket thereon.

A still further object is to provide for invertable mounting of the wall plate.

An additional object is to provide an adaptor elbow in the assembly having the inlet side thereof of smaller diameter than the outlet side so as to produce rapid clearance.

Another object is to provide such an elbow bored out at each end to maintain the inside diameters and eliminate the possibility of obstruction and whistling.

Still another object is to provide a threadless air-tight connection between the adaptor elbow and the inlet and outlet tubes.

A further object of the invention is to provide the elbow with an integral mounting flange for adjustable connection to the mounting plate, and with a slotted lug and clamping bolt for connecting the outlet tube thereto.

A still further object is to provide a slip-fit of the inlet and outlet tubes in the elbow, with an adhesive coating on the inside of the elbow and the outside of the tubes to provide an air-tight seal.

It is also an object to provide an alternate form of seal comprising annular grooves within the elbow and O-rings located therein for distortion and compression by insertion of the tubes.

Another object is to provide depressions in the mounting plate for accommodating the upper end of the hinged cover, in open position, in order to compensate for reduced wall thickness.

A further object is to provide for installing the improved inlet valve in the wall of an existing building, where it is not possible to attach the supporting plate to a stud or the like within the wall.

A still further object of the invention is to provide for installation of the inlet valve in a floor instead of in a wall.

The above and other objects which will be apparent to those skilled in the art from the following description and the accompanying drawings, or which may be hereinafter pointed out, may be attained by constructing the inlet valve assembly in the manner illustrated in the drawings and hereinafter described in detail.

In general terms, the invention may be briefly described as comprising the assembly of a wall plate with an inlet opening and normally closed hinged cover therefor, an adaptor elbow connected at one end to the inlet opening of the wall plate by an inlet tube and connected at its other end to an outlet tube leading to the centrally located vacuum apparatus, and a mounting plate with means for attachment to the adaptor elbow and to the wall plate whereby the elbow may be mounted within a wall and the wall plate upon the exterior of the wall.

The mounting plate is so constructed and arranged that it may be mounted in either vertical or horizontal position and attached to either vertical or horizontal studding or other support members within the wall.

The inlet valve assembly may also be installed in the walls of existing buildings, where it is not possible to attach the mounting plate to a stud or the like within the wall, the mounting plate and wall plate being connected together by screws so as to sandwich the wall plaster therebetween. Where occasion requires, the inlet valve may be mounted in a floor instead of in a wall.

Means is provided whereby the elbow may be adjusted relative to the mounting plate, and means is also provided whereby the wall plate may be adjusted relative to the mounting plate. These means and other features of the mounting plate are illustrated in the drawings and hereinafter described in detail.

The adaptor elbow is smaller at the inlet side than at the outlet side so as to produce rapid clearance and eliminate whistle, and provides a threadless air-tight attachment of the inlet and outlet tubes and other features illustrated and described in detail hereinafter.

The wall plate is provided with a spring-loaded hinged cover normally closing the inlet opening, the lower end of the cover being outwardly curved providing a finger opening, a rubber sealing gasket being provided upon the inner side of the cover and sealing the inlet opening, this gasket being so located with reference to the lower end of the cover to provide a fingernail clearance.

These and other features of the wall plate and cover are illustrated in the drawings and hereinafter described in detail.

Having thus briefly described the invention, reference is made to the accompanying drawings, illustrating preferred embodiments of the invention, in which:

Fig. 1 is a vertical sectional view through the assembly of mounting plate, adapter elbow and wall plate, with inlet and outlet tubes mounted within a wall, the hinged cover and the inlet opening being shown in open position;

Fig. 2 is a detached front elevation of the mounting plate forming part of the assembly;

Fig. 3 is a detached plan sectional view of the mounting plate, showing the same mounted in a wall;

Fig. 10 is a fragmentary vertical sectional view through the wall plate with the hinged cover in closed position, showing the manner in which a finger may be inserted to open the hinged cover;

Figure 4:
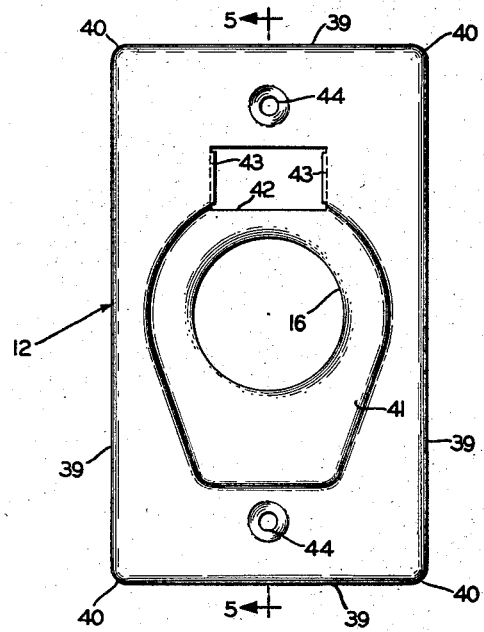
Fig. 4 is a detached front elevation of the wall plate.
Figure 5:
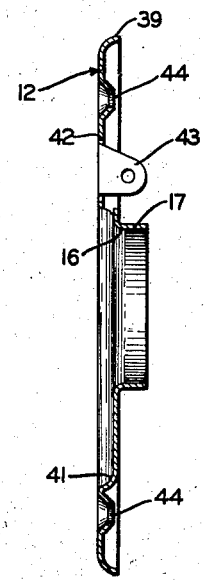
Fig. 5 is a detached, vertical, sectional view of the wall plate taken as on the line 5—5, Fig. 4.

Referring now more particularly to the embodiment of the invention illustrated in the drawings, the improved inlet valve assembly and central vacuum system to which the invention pertains comprises generally a mounting plate indicated generally at 10, an adapter elbow indicated generally at 11, a wall plate indicated generally at 12 and provided with a hinged cover indicated generally at 13.

The inlet end 14 of the adapter elbow is connected by the inlet tube 15 to the inlet opening 16 in the wall plate, an inwardly disposed annular flange 17 being formed upon the wall plate surrounding said inlet opening. An outlet tube 18 is connected to the outlet end 19 of the elbow and leads to the centrally located vacuum apparatus.

A portion of a wall is shown in section in Fig. 1, a vertical stud being shown at 20 with plasterboard and plaster or other structure providing a conventional wall thickness on opposite sides of said stud as indicated at 21—21.

As clearly shown in Fig. 1, the inlet end 14 of the adapter elbow is of smaller diameter than the outlet end 19 thereof, and inlet tube 15 is proportionally smaller in diameter than the outlet tube 18. A threadless connection is provided between the tubes 15 and 18 and the corresponding ends of the elbow 11. For this purpose the inlet and outlet ends of the elbow are bored as indicated at 22 and 23 respectively, to a proper inside diameter to provide a slip-fit for the tubes 15 and 18 respectively. In order to provide an air-tight seal for these joints, a coating of adhesive material A is placed in the bores 22 and 23 of the elbow and upon the outer surfaces of the tubes 15 and 18.

The mounting plate, indicated generally at 10, may be formed of metal or other suitable material and is of substantially rectangular shape, the corners at one end of said mounting plate may be chamfered or beveled as indicated at 24, the other end portion of the mounting plate being bent backward at a 90° angle forming the attaching flange 25. A circular opening 26 is centrally located within the attaching plate, being of proper diameter to provide a slip-fit of the inlet tube 15 therethrough.

A plurality of elongated recesses 27 are provided in the mounting plate surrounding the central aperture 26, the recesses being four in number and one recess being located between the central aperture and each edge of the mounting plate, and parallel to the edge of the plate, as shown in the drawings. Each of these recesses is preferably formed by slitting along three edges and then bending the cut-out portion of the metal backward along the fourth edge forming the backwardly angled flange 28.

Between each recess 27 and the adjacent edge of the mounting plate 10, and substantially close to said edge, an elongated slot 29 is formed in the plate. An elongated rectangular cut-out 32 is formed in the base of the flange 25 of the mounting plate, close to the adjacent elongated slot 29. The cut-out 32 is for a purpose which will be hereinafter described in detail.

Angularly disposed elongated slots 33 are located in a circle around the central openings 26 and at equally spaced points between the recesses 27. Apertures 34, for receiving nails, screws or similar fastening means, are located in the angular flange 25 for attaching the mounting plate to a stud or similar support member within a wall. Similar apertures 35 may be optionally provided in the opposite corner portions of the mounting plate.

The adapter elbow 11 is provided with an integral flange 36 at the smaller end 14 thereof. Apertures 37 are located in the corner portions of this flange and are screw-threaded for receiving attaching screws 38 located through the elongated slots 33 in the mounting plate. These elongated slots provide for axial adjustment of the elbow relative to the mounting plate.

The wall plate 12 is formed of sheet metal or other suitable material, and is of rectangular panel shape, being adapted to be mounted upon a wall 21 with its longest dimension vertically disposed. A rearwardly disposed rounded flange or bead 39 is preferably formed upon the marginal edges of the wall plate, and the corners thereof are preferably rounded as indicated at 40.

Surrounding the inlet opening 16, a rearwardly disposed pocket 41 is formed in the wall plate, the upper portion of said recess being of semi-circular shape and the lower portion being downwardly tapered. A substantially rectangular opening 42 is formed at the upper end of the recess 41, with the rearwardly disposed ears 43 located at opposite ends thereof.

Countersunk screw apertures 44 are centrally located in the upper and lower end portions of the wall plate for receiving the heads of the flat or oval head screws 45 which are located through the opening 46 in the adjacent wall thickness 21 and are threaded into the Tinnerman-type nuts 47, located over the central portions of the edges of the mounting plate 10, at the elongated slots 29 therein. These elongated slots permit adjustment of the screws 45 and Tinnerman-type nuts 47 relative to the mounting plate 10, whereby the wall plate 12 may be adjusted accurately to vertical position upon the wall.

The hinged cover 13 may be formed of sheet metal or other suitable material and is shaped to conform to the depression or pocket 41 in the wall plate, with the rectangular extension 49 at its upper end conforming to the rectangular cut-out 42 in the wall plate. A rearwardly disposed flange 50 is formed around the marginal edges of the hinged cover, at the top and side edges thereof, terminating at points near the lower end thereof.

On either side edge of the extension 49, the marginal flange 50 is extended to form the ears 51. A hinge pin 52 is located through suitable apertures in the ears 43 and 51, hingedly connecting the cover 13 to the wall plate 12.

The upper end portion of the extension 49 of the hinged cover is preferably curved backwardly, as indicated at 53, and the lower end 54 of the hinged cover is inclined or curved outwardly to provide a finger opening to permit insertion of a finger or fingers behind the same for opening the hinged cover, as indicated in broken lines at F in Fig. 10.

For the purpose of normally holding the hinged cover in closed position, coil springs 55 may be located around the hinge pin 52, one end of said springs bearing against the inner surface of the hinged cover above the pin and the other ends contacting the inner surface of the wall plate below the pin.

A rubber gasket 56 is mounted on the inner side of the hinged cover for normally sealing the inlet opening in the wall plate when the cover is in closed position. This rubber gasket terminates at a sufficient distance from the lower, out-turned end 54 of the cover to provide a clearance for the fingernails when the fingers are inserted behind the out-turned end 54 to raise the cover to open position.

The rubber gasket 56 and combination washer 57 are attached to the hinged cover by means of an oval head screw 58, the head of which is located in the countersunk aperture 59 of the cover, a nut 60 being threaded upon the other end of said screw.

Angular projections 61 may be formed upon the edges of the combination washer 57 for contact with the conventional adapter nipple N upon a flexible attachment hose when the same is inserted into the inlet tube 15 during operation of the system, as shown in Fig. 1.

The inlet cover 13 can be raised by engaging the end of the adapter nipple N beneath the out-turned lower end 54 of the cover, and the adapter nipple may then be pushed into place with one hand, to the position shown in Fig. 1.

Figure 8:
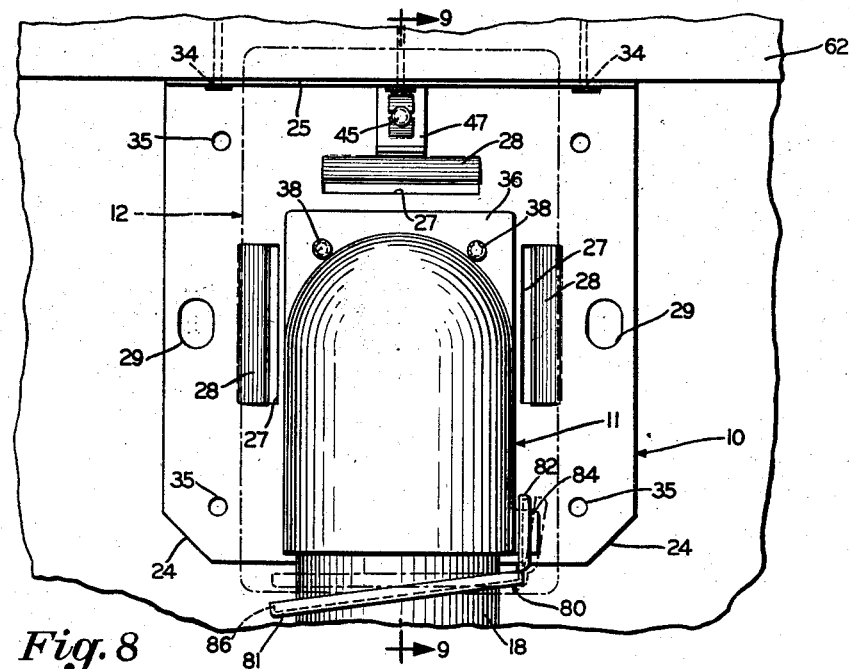
Fig. 8 is a rear elevation of the assembly, showing the mounting plate horizontally mounted within the wall and attached to a horizontal studding or supporting member.
Figure 9:
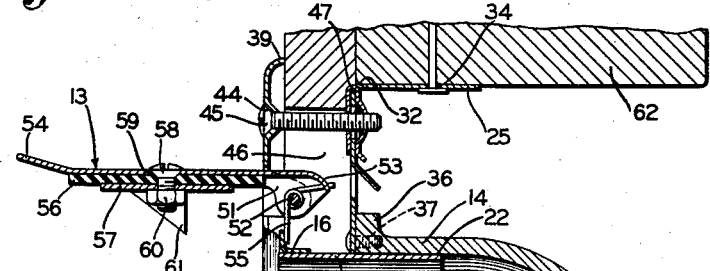
Fig. 9 is a vertical sectional view taken on the line 9—9, Fig. 8.

In Figs. 8 and 9 is shown the manner in which the mounting plate 10 may be attached to a stud or other horizontally disposed supporting member 62. For this purpose the mounting plate 10 is given a quarter turn from the position shown in Figs. 1 and 2, the attaching flange 25 thereof being then located at the top edge of the mounting plate and attached to the horizontal stud or supporting member 62.

It should be undersood that for mounting the mounting plate upon a horizontal stud or the like, the mounting plate may be turned so the attaching flange 25 is at its lower edge for attachment to a horizontal stud or other supporting member located below the mounting plate, instead of above the same as shown in Figs. 8 and 9.

Also, it should be understood that instead of attaching the flange 25 of the mounting plate to a stud at the right side of the mounting plate as shown in Fig. 3, the mounting plate may be given a one-half turn from this position so as to locate the attaching flange at the left edge thereof for attachment to a stud at the left side of the mounting plate.

For the purpose of securely holding the outlet tube 18 in position in the elbow 11 until the adhesive has become completely set, a clamping ring such as indicated generally at 80 in Figs. 1, 8, 9 and 14 may be provided.

This clamping ring, as best shown in Fig. 14, may be formed of sheet metal or the like, and comprises generally the ring portion 81 and the ear 82 extending upward from the ring and located at an angle of slightly less than 90° thereto.

An aperture 83 is formed in the ear 82, of suitable size to receive the lug 84 on one side of the outlet end portion of the elbow 11, as shown in Figs. 1, 8 and 9.

The central opening 85 in the ring 81 is of slightly larger diameter than the outside diameter of the outlet tube 18. In order to strengthen the clamping ring an annular flange 86 may be formed around the ring portion 81, and a similar flange 87 may be formed at the top and side edges of the ear portion 82. Strengthening ribs 88 may also be formed in the ear portion, all as best shown in Fig. 14.

In assembling the clamping ring upon the outlet tube 18 and elbow 11, the ring portion 81 is first slidably mounted upon the outlet tube about 2 inches from the end of the tube, with the ear 82 located toward the elbow. This leaves the upper end of the tube accessible for the application of adhesive. A coating of the adhesive material is then placed in the outlet bore 23 of the elbow and upon the exterior of the upper end of the outlet tube 18, in the manner above described. The upper end of the outlet tube 18 is then pushed up into the outlet bore 23 of the elbow.

The clamping ring is then slidably moved upward upon the outlet tube 18 to the broken line position shown in Fig. 8. Then, while holding the outlet tube 18 firmly in place relative to the elbow, the ring is tilted relative to the outlet tube, to the full line position shown in Figs. 1, 8 and 9, engaging the aperture 83 of the ear on the lug 84.

As shown in these figures it is seen that the side of the ring 81 opposite to the ear 82 is tilted down, so that the ring 81 is clamped or wedged upon the exterior of the outlet tube, while the upper end of the ear 82 is tilted toward the elbow 11, thus holding the outlet tube fixedly in position and preventing it from moving downward.

With this arrangement the adhesive coated end of the tube may be inserted into the elbow without the coated end having to pass through the clamping ring, thus preventing the adhesive from being scraped from the tube by the ring.

It should be understood that the length of the ear 82 and of the aperture 83 therein, are sufficient to permit manipulation of the clamping ring in the manner described, after the tube has been fully inserted into the elbow, so that the ring may be slidably moved up on the tube and tilted to clamped position with the ring portion 81 located spaced below the lower end of the elbow.

Figure 7:
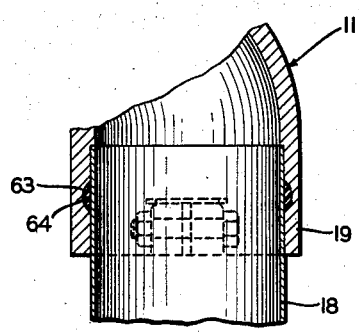
Fig. 7 is a fragmentary sectional view of a portion of the adapter elbow and one of the tubes connected thereto showing an alternative form of seal.
Figure 6:
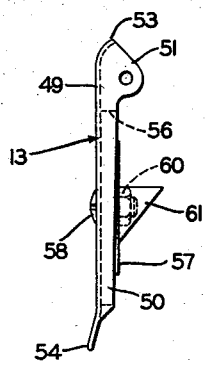
Fig. 6 is a detached edge elevation of the hinged cover.

As shown in Fig. 7, instead of sealing the inlet and outlet tubes in the adapter elbow 11 by means of adhesive as above described, an O-ring may be provided for forming an air-tight seal of these joints. For this purpose opposite ends of the elbow may be bored as above described so as to provide a slip-fit for the inlet and outlet tubes, and an annular groove 63 is formed in each bore to receive an O-ring 64 which is distorted and compressed by insertion of the tube, as shown in said Figure.

It should also be understood that, if desired, the wall plate 12 may be mounted in inverted position. Thus, it will be apparent that the construction and arrangement of the inlet valve assembly is such that practically universal adjustment of the parts may be attained, with the mounting plate attached in any one of four different positions, and the elbow located in any one of four different positions so that the outlet tube 18 may extend downward, upward or to the right or left.

In any relative position of the mounting plate and elbow, the wall plate may be accurately adjusted and attached in vertical position, and the elbow and wall plate may be accurately adjusted to proper position as the parts are assembled, and securely held in such position.

Figure 11:
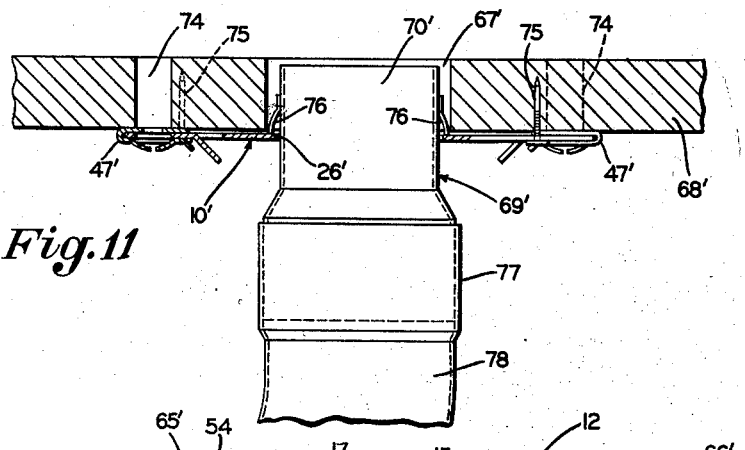
Fig. 11 is a sectional elevation showing the first step of a floor installation of the inlet valve.
Figure 12:
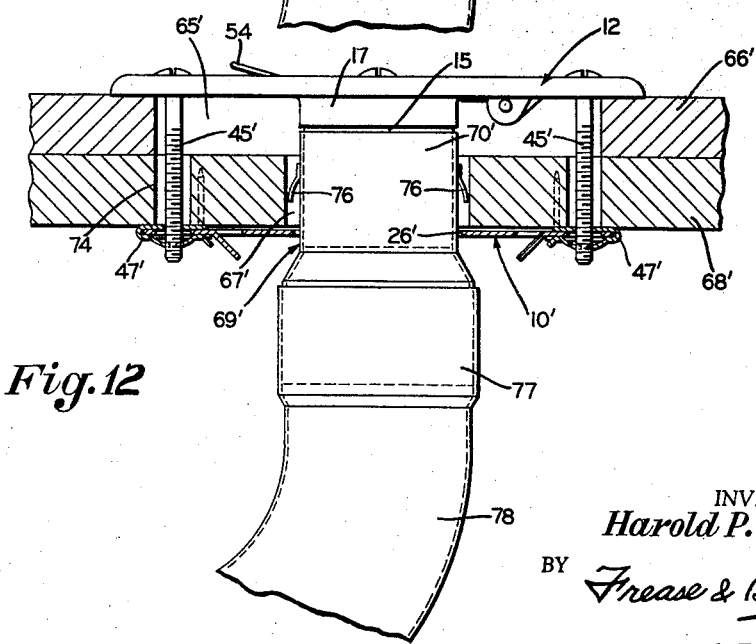
Fig. 12 is a sectional elevation showing the completed floor installation.

A floor installation of the inlet valve may be made in new construction in the manner shown in Figs. 11 and 12. When the subfloor 68' has been laid, an opening 67' is formed therein at the desired location, and smaller apertures 74 are cut in the subfloor at each side thereof.

A mounting plate 19', similar to the mounting plate 10 above illustrated and described, but without the angular flange 25, is then attached to the underside of the subfloor 68' by nails 75 located through the apertures provided therefor. The central opening 26' in the mounting plate is centered relative to the opening 67' in the subfloor, and the Tinnerman-type nuts 47' are centered with the smaller openings 74 in the subfloor.

An adapter 69' is assembled upon the mounting plate, the smaller upper portion 70' thereof being located through the central opening 26' in the mounting plate. The adapter is retained in assembled condition with the mounting plate by means of the spring clips 76, the upper ends of which are welded or otherwise attached to opposite sides of the smaller portion 70' of the adapter. The outwardly disposed lower ends of the spring clips 76 will contact the top of the mounting plate as shown in Fig. 11.

Appropriate fittings may then be attached to the adapter 69' for connection to the main line. By way of example, the bell end 77 of an elbow 78 is shown attached to the lower end of the adapter. It should be understood that an adhesive coating may be located between the adapter and elbow, or other fitting, for providing a seal.

When the finish floor 66' is laid, an opening 65' is provided, as shown in Fig. 12. A wall plate 12 is then positioned upon the finish floor, over said opening, and is attached to the mounting plate by screws 45' located through the apertures provided therefor in the wall plate and threaded into the Tinnerman-type nuts 47'.

Figure 13:
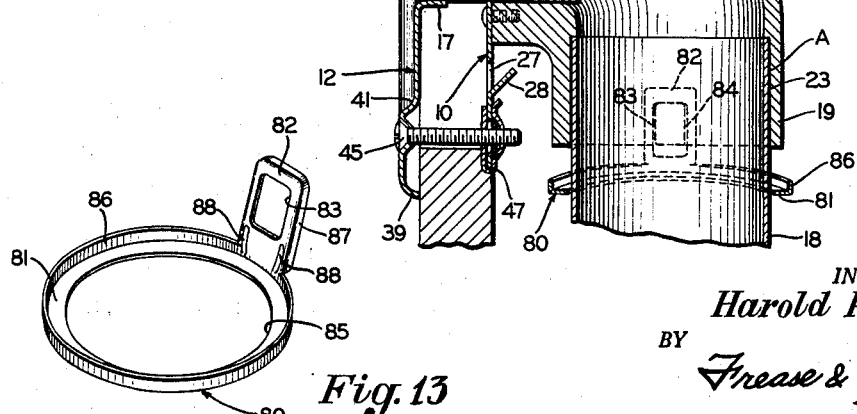
Fig. 13 is a perspective view of the clamping ring.

The adapter 69' is then adjusted vertically so as to make the proper connection of the upper portion 70' thereof with the inlet tube 15 carried by the wall plate 12, as shown in Fig. 13. This joint should also be sealed with an adhesive coating.

For the purpose of installing the inlet valve in exterior walls, so as to be accessible from porches, patios, garages and the like, the installation may be made in the manner shown in Figs. 11 and 12, it being understood of course that the wall plate 12 and mounting plate 10' would be located vertically.

As best shown in Fig. 10, one end of the inlet tube 15 extends through the opening 16 and slightly beyond the recessed face of the wall plate, so that the gasket 56 on the hinged cover will contact said end of the tube 15, providing a reduced area of contact between the tube and the gasket, thus affording a perfect seal when the hinged cover is closed.

The device is referred to throughout the specification as an inlet valve, for the reason that it forms an inlet to the central vacuum system. However, devices of this general type are sometimes referred to in the industry as outlets, and it is not the intention to limit the invention in any manner by such language.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. An inlet valve assembly for a central vacuum system for installation in a wall or floor having a wall thickness member with an opening therein, said inlet valve assembly comprising a mounting plate having a central aperture therein, means for mounting said mounting plate over said opening on one side of the wall thickness member, a tubular adaptor, means for mounting said tubular adaptor in register with the central aperture in the mounting plate, a wall plate having an inlet opening therein and a hinged cover for normally closing said inlet opening, means for attaching the wall plate to the mounting plate with the wall plate located upon the opposite side of the wall thickness member, an inlet tube extending inwardly from the inlet opening in the wall plate, means attaching the inlet tube to the adjacent end of the tubular adaptor, and an outlet tube connected to the other end of the tubular adaptor.

2. An inlet valve assembly as defined in claim 1 in which the inlet and outlet tubes each have a slip fit with the tubular adaptor and are sealed thereto with adhesive material.

3. An inlet valve assembly as defined in claim 1 in which a clamping ring is located around the outlet tube and provided at one side with an upright ear having an aperture therein, and a lug upon the tubular adaptor is received in said aperture, the ring being tilted downward on the side opposite to said ear so as to be tightly wedged upon the outlet tube.

4. An inlet valve assembly for a central vacuum system for installation in a wall having spaced support members and wall thickness members attached to opposite sides thereof, said inlet valve assembly comprising a mounting plate located between said wall thickness members, means at one edge of the mounting plate for attachment to one of said support members within the wall, an adaptor elbow, means for attaching the adaptor elbow to the inner side of the mounting plate, a wall plate having an inlet opening therein and a hinged cover for normally closing said inlet opening, means for attaching the wall plate to the mounting plate with the wall plate located upon the exterior of the wall, an inlet tube extending inwardly from the inlet opening in the wall plate, means attaching the inlet tube to the adjacent end of the elbow, an outlet tube, and means attaching the outlet tube to the other end of the elbow.

5. An inlet valve assembly as defined in claim 4 in which the support members are vertical and a flange is provided at one vertical edge of the mounting plate for attachment to one of the support members.

6. An inlet valve assembly as defined in claim 4 in which the means for attaching the inlet tube and outlet tube to the adaptor elbow, comprises smooth bores in the ends of the adaptor elbow, smooth outer surfaces upon the adjacent end portions of the inlet and outlet tubes providing slip fits thereof into said bores of the adaptor elbow, and coatings of adhesive material in said bores and upon said smooth outer surfaces of said adjacent end portions of the inlet and outlet tubes.

7. An inlet valve assembly as defined in claim 1 in which a rubber gasket is located on the inner side of the hinged cover for normally sealing the inlet opening and in which the lower end of the hinged cover is inclined outward forming a finger opening and the lower portion of said rubber gasket terminates at a point spaced from said finger opening.

8. An inlet valve assembly as defined in claim 1 in which the means for attaching the wall plate to the mounting plate comprises Tinnerman-type nuts adjustably mounted upon the mounting plate and bolts located through the wall plate and engaging said nuts.

References Cited in the file of this patent

UNITED STATES PATENTS

| | | |
|---|---|---|
| 1,096,278 | Sutton | May 12, 1914 |
| 1,192,988 | Chamberlain et al. | Aug. 1, 1916 |
| 1,666,629 | Lumley | Apr. 17, 1928 |